(12) United States Patent
Tateishi (10) Patent No.: US 9,723,893 B2
(45) Date of Patent: Aug. 8, 2017

(54) MEMBER FOR SHOE SOLES, AND SHOES (71) Applicant: ASICS CORPORATION, Kobe-Shi, Hyogo (JP)

(72) Inventor: Junichiro Tateishi, Kobe (JP)

(73) Assignee: ASICS Corporation (JP)

( * ) Notice: Subject to any disclaimer, the term of this patent is extended or adjusted under 35 U.S.C. 154(b) by 60 days.

(21) Appl. No.: 14/894,253

(22) PCT Filed: May 30, 2014

(86) PCT No.: PCT/JP2014/064386
§ 371 (c)(1),
(2) Date: Nov. 25, 2015

(87) PCT Pub. No.: WO2014/192910
PCT Pub. Date: Dec. 4, 2014

(65) Prior Publication Data
US 2016/0113354 A1    Apr. 28, 2016

(30) Foreign Application Priority Data
May 31, 2013  (WO) .................. PCT/JP2013/065238

(51) Int. Cl.
| A43B 1/00 | (2006.01) |
| A43B 1/14 | (2006.01) |
| A43B 13/18 | (2006.01) |
| A43B 13/04 | (2006.01) |
| A43B 13/12 | (2006.01) |
| C08J 9/00 | (2006.01) |
| C08J 9/04 | (2006.01) |

(52) U.S. Cl.
CPC .......... *A43B 13/187* (2013.01); *A43B 1/0045* (2013.01); *A43B 13/04* (2013.01); *A43B 13/12* (2013.01); *C08J 9/0061* (2013.01); *C08J 9/04* (2013.01); *C08J 2201/026* (2013.01); *C08J 2207/00* (2013.01); *C08J 2300/22* (2013.01); *C08J 2300/26* (2013.01); *C08J 2400/22* (2013.01); *C08J 2400/26* (2013.01)

(58) Field of Classification Search
CPC ....... A43B 13/187; A43B 3/00; A43B 7/1455; A43B 13/04; A43B 13/12
See application file for complete search history.

(56) References Cited

U.S. PATENT DOCUMENTS

2007/0251572 A1*  11/2007  Hoya .................. C08L 23/0815
                                                                        136/256
2008/0229622 A1*  9/2008  Mori ..................... A43B 13/04
                                                                         36/25 R

FOREIGN PATENT DOCUMENTS

| EP | 2 361 948 A1 | 8/2011 |
| EP | 2 546 291 A1 | 1/2013 |
| JP | H05-125263 | 5/1993 |
| JP | H11-206406 A | 8/1999 |
| JP | 2004-043606 | 2/2004 |
| JP | 2007-238783 | 9/2007 |
| WO | WO-2006/057361 A1 | 6/2006 |

OTHER PUBLICATIONS

International Search Report Issued in PCT/JP2014/064386 on Sep. 2, 2014.
Extended European Search Report for European Patent Application No. 14 80 3595 dated Jan. 4, 2017.

* cited by examiner

*Primary Examiner* — Kara Boyle
(74) *Attorney, Agent, or Firm* — Katten Muchin Rosenman LLP (57) ABSTRACT

Provided is a shoe sole member including a crosslinked foam forming a part or the whole of the shoe sole member, wherein the crosslinked foam is formed by a polymer composition showing specific results in measurement using pulsed NMR.

4 Claims, 3 Drawing Sheets

MEMBER FOR SHOE SOLES, AND SHOES

RELATED APPLICATIONS

This patent application is a national stage application, filed under 35 U.S.C. §371, of International Application No. PCT/JP2014/064386 filed on May 30, 2014, which claims priority to International Application No. PCT/JP2013/065238 filed on May 31, 2013, the contents of which are hereby fully incorporated by reference in their entireties.

FIELD

The present invention relates to a shoe sole member and shoes, more specifically, to a shoe sole member used, for example, as an inner sole, a sock liner, a midsole, or an outer sole, and shoes including such a shoe sole member.

BACKGROUND

Sports shoes used for various competitions are composed of a lot of members. For example, a shoe sole is composed of shoe sole members such as an outer sole, a midsole, and an inner sole.

Materials used for such shoe sole members are required to be lightweight and to have properties such as mechanical strength and shock absorbing properties for reducing deformation due to a long-term use and imparting durability under severe use conditions.

Therefore, the shoe sole members are formed by a foam mainly composed of a crosslinked polymer.

Conventional shoe sole members are formed by a foam obtained by crosslinking and foaming polyurethane, natural rubber, or ethylene-vinyl acetate copolymer, from viewpoints such as durability, cost, and constraints on production. Particularly, shoe sole members formed by a crosslinked foam of ethylene-vinyl acetate copolymer are widely used (see Patent Literature 1 below).

However, conventional crosslinked foams have a problem of being difficult to recover their original shape when a compressive strain is applied for a long time, and having such a phenomenon being increased particularly when they are highly foamed.

Therefore, in the case where a crosslinked foam that is more highly foamed than conventional products for exhibiting lightness of weight is applied as a forming material, conventional shoe sole members may possibly be unable to sufficiently recover after use from the compressive deformation during the use.

A shoe sole member having excellent recovery properties from the compressive deformation can be obtained generally by applying a foam formed by a resin having high rigidity as a forming material.

However, the hardness of a foam formed by a polymer with high rigidity tends to increase to a hardness higher than necessary, as compared to a foam formed by a soft polymer with low rigidity, which makes it difficult to allow shoes to exhibit sufficient comfort.

That is, conventional shoe sole members have a problem of being difficult to provide products that are light and soft, and exhibit excellent comfort during use and excellent recovery properties after the use from the compressive deformation applied during the use.

CITATION LIST

Patent Literature

Patent Literature 1: JP H11-206406 A

SUMMARY

Technical Problem

In order to solve the aforementioned problem, it is an object of the present invention to provide a shoe sole member that is light and soft and exhibits excellent recovery properties after use from the compressive deformation applied during the use, and to provide shoes with comfort.

Solution to Problem

As a result of diligent studies, the inventors have found that the aforementioned problem can be solved by regarding a polymer composition forming a crosslinked foam as being partitioned into three phases of a phase in which a short spin-spin relaxation time is observed in pulsed NMR measurement such as a crystalline phase; a phase in which a long spin-spin relaxation time is observed such as an amorphous phase; and an intermediate phase of these, and forming these three phases in the crosslinked foam in a well-balanced manner.

That is, the inventors have accomplished the present invention by finding that, even when the crosslinked foam is highly foamed, it is possible to allow the crosslinked foam to exhibit appropriate hardness and excellent recovery properties after compressive deformation by forming the three phases in the polymer composition in a well-balanced manner.

The present invention relating to a shoe sole member for solving the aforementioned problem includes a crosslinked foam forming a part or the whole of the shoe sole member, the crosslinked foam having a specific gravity of not more than 0.3, an Asker C hardness of not more than 55, and a compression set of not more than 40% as measured based on an ASTM D395 A method, the crosslinked foam being formed by a polymer composition satisfying conditions represented by the following inequality.

$$[(F_M/T_{2M}+F_L/T_{2L})/(F_S/T_{2S})] > 0.8 \qquad \text{Formula 1}$$

In the formula, the inequality is determined by measuring a spin-spin relaxation time of the polymer composition at 25° C. using pulsed NMR, the term "$F_M$" in the inequality denotes a content ratio in the polymer composition of an m phase in which the spin-spin relaxation time is at least 0.02 ms and less than 0.1 ms, the term "$T_{2M}$" denotes a total spin-spin relaxation time in the m phase, the term "$F_L$" denotes a content ratio in the polymer composition of an l phase in which the spin-spin relaxation time is at least 0.1 ms, the term "$T_{2L}$" denotes a total spin-spin relaxation time in the l phase, the term "$F_S$" denotes a content ratio in the polymer composition of an s phase in which the spin-spin relaxation time is less than 0.02 ms, and the term "$T_{2S}$" denotes a total spin-spin relaxation time in the s phase.

Further, the present invention relating to shoes for solving the aforementioned problem includes such a shoe sole member as described above.

Advantageous Effects of Invention

The crosslinked foam used for the shoe sole member of the present invention includes the l phase and the m phase in which the spin-spin relaxation time is relatively long at a specific ratio or more with respect to the s phase in which the spin-spin relaxation time is relatively short.

Of these three phases, the s phase exhibits properties of the hard region of the polymer constituting the crosslinked foam, and the l phase exhibits properties of the soft region of the polymer constituting the crosslinked foam.

Further, the m phase plays an intermediate role between the s phase and the l phase. The material properties of the crosslinked foam are determined depending on the balance of these s, m, and l phases.

The present invention is not featured by simply adjusting the content ratio of these phases, but is featured by adjusting it so that the content ratio of the respective phases is divided by the spin-spin relaxation time to be expressed as factors ($[F_M/T_{2M}]$, $[F_L/T_{2L}]$, and $[F_S/T_{2S}]$) showing the significance of the effect, and the factors have a specific relationship.

Accordingly, the present invention allows a shoe sole member formed by the crosslinked foam to exhibit lightness of weight and softness, and to exhibit excellent recovery properties after use from the deformation applied during the use.

DESCRIPTION OF EMBODIMENTS

Embodiments of a shoe sole member of the present invention will be described below as examples.

Figure 1:
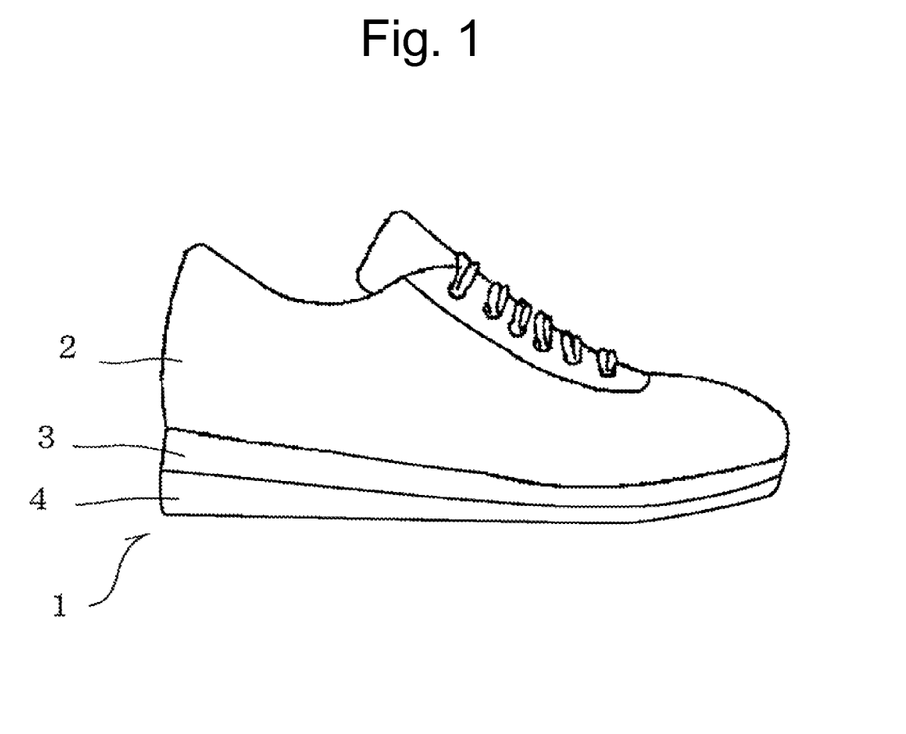
FIG. 1 is a schematic side view showing an aspect of a shoe provided with shoe sole members.

FIG. 1 shows a shoe formed using shoe sole members of this embodiment.

The shoe 1 has an upper material 2 and shoe sole members 3 and 4.

The shoe 1 has a midsole 3 and an outer sole 4 as the shoe sole members.

The shoe sole members of this embodiment are formed using a crosslinked foam having a specific gravity of not more than 0.3, an Asker C hardness of not more than 55, and a compression set of not more than 40%.

When the crosslinked foam is used, for example, for forming the inner sole, the midsole, and the outer sole, the crosslinked foam preferably has a tensile loss modulus at 20° C. of not more than 0.2, as measured according to JIS K 7244-4 "Plastic—Test method for dynamic mechanical properties—Part 4: Tensile vibration—Non-resonance method", in order to allow the members to exhibit appropriate cushioning properties.

The specific gravity of the crosslinked foam is not more than 0.3, in order to allow the shoe sole members of this embodiment to exhibit excellent lightness of weight.

The specific gravity of the crosslinked foam forming the shoe sole members is preferably not more than 0.25.

However, the crosslinked foam having excessively low specific gravity may possibly make it difficult to have a compression set of not more than 40%, and may possibly make the production itself difficult.

Accordingly, the crosslinked foam preferably has a specific gravity of at least 0.05, for facilitating the production such that the compression set is not more than 40%.

The specific gravity of the crosslinked foam means a value measured at a temperature of 23° C. according to the A method "Underwater displacement method" of JIS K7112.

Further, the Asker C hardness of the crosslinked foam is not more than 55, in order to allow the shoe sole members of this embodiment to have excellent softness.

The Asker C hardness of the crosslinked foam forming the shoe sole members is preferably not more than 45.

However, when the shoe sole members are formed by a crosslinked foam having excessively low hardness, the foot comfort of shoes provided with the shoe sole members may possibly be reduced.

Accordingly, the Asker C hardness of the crosslinked foam is preferably at least 10.

The Asker C hardness of the crosslinked foam means an instantaneous value obtained by conducting a spring hardness test according to the type C of JIS K7312 at 23° C.

More specifically, the Asker C hardness can be determined by removing a surface portion from a crosslinked foam formed into a specific shape, for example, by in-mold foam molding to produce a plate measurement sample having a thickness of at least 10 mm, and subjecting the measurement sample to measurement based on JIS K7312.

In this embodiment, the compression set of the crosslinked foam is not more than 40%, in order to allow the shoe sole members subjected to compressive deformation during use of shoes to easily recover after the use of the shoes to the state before the use.

The compression set is a value measured based on the ASTM D395 A method (constant load test).

Specifically, the compression set means a value obtained by applying a pressure of 0.59 MPa to the measurement sample at a temperature of 23° C. for 22 hours, and measuring the thickness of the measurement sample after 30 minutes from the release of the measurement sample from the pressure.

In order to allow the crosslinked foam of this embodiment to exhibit the aforementioned properties, it is important for the polymer composition forming the crosslinked foam to have specific molecular mobility.

That is, in order to allow the crosslinked foam to exhibit the aforementioned properties, it is important to form a crystalline region in which the molecular motion is strongly restricted due to the crystal structure or quasicrystal structure and an amorphous region in which the molecular motion of molecular chains is comparatively free, in the bubble membrane of the crosslinked foam at an appropriate ratio, and to form crosslinks or pseudo crosslinks in the amorphous region at an appropriate ratio.

More specifically, in order to allow the crosslinked foam to exhibit the aforementioned properties, it is necessary for the polymer composition constituting the crosslinked foam to satisfy the conditions represented by the following inequality in the pulsed NMR measurement.

The spin-spin relaxation time can be determined, for example, by measurement according to the solid echo method at a temperature of 25° C. using pulsed NMR, "Minispec mq20" (type name), manufactured by Bruker Optics K.K.

$$[(F_M/T_{2M}+F_L/T_{2L})/(F_S/T_{2S})]>0.8 \qquad \text{Formula 2}$$

The polymer composition constituting the crosslinked foam preferably satisfies the conditions represented by the following inequality in the pulsed NMR measurement, for exhibiting the aforementioned properties more reliably.

$$[(F_M/T_{2M}+F_L/T_{2L})/(F_S/T_{2S})]>1 \quad \text{Formula 3}$$

Here, the above-described inequality is obtained from the pulsed NMR measurement at 25° C. by partitioning the polymer composition into the s phase in which the spin-spin relaxation time is less than 0.02 ms, the m phase in which the spin-spin relaxation time is at least 0.02 ms and less than 0.1 ms, and the l phase in which the spin-spin relaxation time is at least 0.1 ms.

In the pulsed NMR measurement, when the elapsed time after a pulse magnetic field is applied is denoted by t (ms), the magnetization in the condition of t=0 is denoted by $M_0$, and the magnetization at the time t is denoted by M (t), the spin-spin relaxation time ($T_2$) is determined based on the following formula.

The letter "W" in the following formula denotes a Weibull modulus.

$$M(t) = M_0 \exp\left(-\frac{t}{T_2}\right)^W \quad \text{Formula 4}$$

With respect to the i-th (i<n) component in n components into which the measurement target is decomposed, when the magnetization of the i-th component in the condition of t=0 is denoted by $M_{0i}$, and the Weibull modulus of the i-th component is denoted by $W_i$, the spin-spin relaxation time ($T_{2i}$) of the i-th component and the ratio $F_i$ of the i-th component are determined based on the following formula.

For example, $W_S=2$, $W_M=1$, and $W_L=1$ can be used as the Weibull modulus Wi.

Such a method for determining the relaxation time is, for example, disclosed in S. Yamasaki et al Polymer 48 4793 (2007).

$$M(t) = \sum_i^n M_{0i} \exp\left(-\frac{t}{T_{2i}}\right)^{W_1} \quad \text{Formula 5}$$

$$F_i = \frac{M_{0i}}{\sum_i^n M_{0i}} \quad \text{Formula 6}$$

Specifically, the term [$F_S/T_{2S}$] is determined by obtaining, from the results of the pulsed NMR measurement, the ratio ($F_S$) of the s phase in which the spin-spin relaxation time is longer than 0 ms and less than 0.02 ms with respect to the entirety and the total sum ($T_{2S}$ [ms]) of the relaxation time in the a phase, and dividing the ratio ($F_S$) of the s phase by the total ($T_{2S}$) of the spin-spin relaxation time.

Likewise, the term [$F_M/T_{2M}$] is determined by obtaining the ratio ($F_M$) of the m phase in which the spin-spin relaxation time is at least 0.02 ms and less than 0.1 ms with respect to the entirety and the total sum ($T_{2M}$) of the relaxation time in the m phase, and dividing the ratio ($F_M$) of the m phase by the total ($T_{2M}$) of the spin-spin relaxation time.

Further, the term [$F_L/T_{2L}$] is determined by obtaining the ratio ($F_L$) of the l phase in which the spin-spin relaxation time is at least 0.1 ms with respect to the entirety and the total sum ($T_{2L}$) of the relaxation time in the l phase, and dividing the ratio ($F_L$) of the l phase by the total ($T_{2L}$) of the spin-spin relaxation time.

These terms represent not only the ratio of the s phase, the m phase, and the l phase simply, but also an index of each phase with the spin-spin relaxation time in the denominator.

This point is described in detail by way of an example of the s phase as follows. Even in the components constituting the same s phase, the components with a short spin-spin relaxation time have higher functions for allowing the crosslinked foam to exhibit hardness and shock absorbing properties, as compared to the components with a long spin-spin relaxation time.

Therefore, the influence of each phase on the hardness and shock absorbing properties of the crosslinked foam can be accurately understood by designing the polymer composition used for forming the crosslinked foam using an index with the content ratio of the s phase, the m phase, and the l phase in the numerator and the relaxation time in the denominator than by simply designing the polymer composition using only the content ratio as an index.

For example, when the first case where the content ratio in the polymer composition of the s phase is lower than that of the m phase or the l phase, and the s phase is mainly composed of components of the short spin-spin relaxation time is compared to the second case where the s phase mainly composed of components the longer spin-spin relaxation time than in the first case is contained in the polymer composition at a higher ratio with respect to the m phase or the l phase than in the first case, there is not much difference between the two because, though the numerator of the index in the first case is smaller than in the second case, the denominator is also smaller.

Further, according to the findings by the inventors, not much difference occurs between the first case and the second case, also in the significance of effects of imparting hardness and shock absorbing properties to the crosslinked foam.

In this way, the properties of the crosslinked foam can be accurately represented by using a value obtained by dividing the content ratio of each phase by the spin-spin relaxation time as an index.

The index of the s phase is an important element to determine the properties of the crosslinked foam, and therefore the term [$F_S/T_{2S}$] is preferably a value satisfying the following conditions.

$$1 \leq [F_S/T_{2S}] \leq 20$$

Further, the terms [$F_L/T_{2L}$] and [$F_M/T_{2M}$] are preferably values satisfying the following conditions, in order to impart recovery properties from deformation and flexibility to the crosslinked foam.

$$0.1 \leq [F_L/T_{2L}] \leq 10$$

$$1 \leq [F_M/T_{2M}] \leq 30$$

In general polymers, the spin-spin relaxation time ($T_{2S}$, $T_{2M}$, and $T_{2L}$) and the content ratio ($F_S$, $F_M$, and $F_L$) of each phase do not significantly vary before and after crosslinking.

Therefore, a crosslinked foam satisfying the relationship represented by the aforementioned inequality can be obtained with high probability by performing the pulsed NMR measurement in an uncrosslinked state to prepare a polymer satisfying the relationship represented by the aforementioned inequality, and applying the polymer as a base polymer of the polymer composition for forming the crosslinked foam.

Further, in general polymers, the spin-spin relaxation time and the content ratio of each phase are not significantly different depending on whether or not they are foamed.

Therefore, in the case where it is necessary to predict whether or not the crosslinked foam satisfying the relationship represented by the aforementioned inequality can be obtained more reliably, the prediction may be performed by producing a non-foamed crosslinked sample using the base polymer and subjecting the sample to the pulsed NMR measurement.

For determining the content ratio of the s phase, the m phase, and the l phase, a crystalline phase is mainly observed as the s phase in the pulsed NMR measurement, and an amorphous phase is mainly observed as the m phase or the l phase, for example, in the case of a crystalline polymer.

Further, in the case of a block copolymer having a hard segment and a soft segment, the hard segment portion is mainly observed as the s phase in the pulsed NMR measurement, and the soft segment portion is mainly observed as the m phase or the l phase.

Accordingly, the tendencies of the relaxation time and the content ratio depending on the degree of crystallinity can be understood, for example, by subjecting several types of polyethylene with different density (different degrees of crystallinity) to the pulsed NMR measurement to collect data of the spin-spin relaxation time and the content ratio of each phase.

That is, in the case of using polyethylene as the base polymer of the crosslinked foam, the spin-spin relaxation time and the content ratio of each phase of the crosslinked foam can be predicted from the results of the pulsed NMR measurement for the other types of polyethylene, even if the polyethylene to be used is not necessarily subjected to the pulsed NMR measurement in advance.

Further, also for the block copolymer, how the spin-spin relaxation time and the ratio vary depending on the ratio of the hard segment and the soft segment can be known likewise by subjecting several types with different ratios of the hard segment and the soft segment to the pulsed NMR measurement.

Further, in the case where a plurality of polymers are contained in the polymer composition, the spin-spin relaxation time ($T_{2S}$, $T_{2M}$, and $T_{2L}$) and the content ratio ($F_S$, $F_M$, and $F_L$) of each phase of the crosslinked foam can be predicted by measuring the spin-spin relaxation time and the ratio in each polymer, and calculating the weighted averages of these polymers corresponding to the mixed ratio in the polymer composition.

That is, the term $[F_S/T_{2S}]$ shows a higher value when the polymer composition contains a greater amount of a crystalline polymer with high degree of crystallinity or a block copolymer with higher content of the hard segment.

Further, to the contrary, the term $[F_L/T_{2L}]$ or $[F_M/T_{2M}]$ shows a higher value when the polymer composition contains a greater amount of a crystalline polymer with low degree of crystallinity or a block copolymer with higher content of the soft segment.

The base polymer as the main component of the polymer composition is not specifically limited in this embodiment, and may be the same polymers as used for forming conventional shoe sole members.

As the base polymer, one or two or more selected from olefin base polymers such as polyethylene, polypropylene, ethylene-propylene copolymer, propylene-1-hexene copolymer, propylene-4-methyl-1-pentene copolymer, propylene-1-butene copolymer, ethylene-1-hexene copolymer, ethylene-4-methyl-pentene copolymer, ethylene-1-butene copolymer, 1-butene-1-hexene copolymer, 1-butene-4-methyl-pentene, ethylene-methacrylic acid copolymer, ethylene-methyl methacrylate copolymer, ethylene-ethyl methacrylate copolymer, ethylene-butyl methacrylate copolymer, ethylene-methyl acrylate copolymer, ethylene-ethyl acrylate copolymer, ethylene-butyl acrylate copolymer, propylene-methacrylic acid copolymer, propylene-methyl methacrylate copolymer, propylene-ethyl methacrylate copolymer, propylene-butyl methacrylate copolymer, propylene-methyl acrylate copolymer, propylene-ethyl acrylate copolymer, propylene-butyl acrylate copolymer, ethylene-vinyl acetate copolymer, and propylene-vinyl acetate copolymer, for example, can be applied.

Further, one or two or more selected from base polymers other than the olefin base polymers such as polyurethane polymers, e.g., polyester polyurethane and polyether polyurethane; and styrene polymers, e.g., styrene-ethylene-butylene copolymer (SEB), styrene-butadiene-styrene copolymer (SBS), a hydrogenated product of SBS (styrene-ethylene-butylene-styrene copolymer (SEBS)), styrene-isoprene-styrene copolymer (SIS), a hydrogenated product of SIS (styrene-ethylene-propylene-styrene copolymer (SEPS)), styrene-isobutylene-styrene copolymer (SIBS), styrene-butadiene-styrene-butadiene (SBSB), styrene-butadiene-styrene-butadiene-styrene (SBSBS), polystyrene, acrylonitrile styrene resin (AS resin), and acrylonitrile butadiene styrene resin (ABS resin) can be applied as the base polymer.

Further, examples of polymers that can be applied as the base polymer in this embodiment include fluorine polymers such as fluororesin and fluororubber; polyamide polymers such as polyamide resins and polyamide elastomers, e.g., polyamide 6, polyamide 11, polyamide 12, polyamide 6,6, and polyamide 610; polyester resins such as polyethylene terephthalate and polybutylene terephthalate; polyvinyl chloride resins; acrylic resins such as polymethylmethacrylate; silicone elastomers; butadiene rubber (BR); isoprene rubber (IR); chloroprene (CR); natural rubber (NR); styrene butadiene rubber (SBR); acrylonitrile butadiene rubber (NBR); and butyl rubber (IIR).

In order to form the crosslinked foam by crosslinking and foaming such a polymer, a crosslinking agent and a foaming agent that are used generally for forming crosslinked foams can be used also in this embodiment.

As the crosslinking agent, organic peroxides, maleimide crosslinking agents, sulfur, phenolic crosslinking agents, oximes, and polyamines, for example, can be applied. Among these, organic peroxides are preferable.

As the organic peroxides, one or two or more selected from dicumyl peroxide, di-t-butyl peroxide, 2,5-dimethyl-2,5-di-(t-butylperoxy) hexane, 2,5-dimethyl-2,5-di-(t-butylperoxy)hexyne-3,1,3-bis(t-butylperoxyisopropyl)benzene, 1,1-bis(t-butylperoxy)-3,3,5-trimethylcyclohexane, n-butyl-4,4-bis(t-butylperoxy)valerate, benzoyl peroxide, p-chlorobenzoyl peroxide, 2,4-dichlorobenzoyl peroxide, t-butylperoxybenzoate, t-butyl perbenzoate, t-butylperoxyisopropyl carbonate, diacetyl peroxide, lauroyl peroxide, and t-butyl cumyl peroxide, for example, can be applied.

The organic peroxides are preferably used for forming the crosslinked foam in a ratio of at least 0.01 part by mass and not more than 10 parts by mass with respect to 100 parts by mass in total of polymers contained in the polymer composition of this embodiment.

Further, the crosslink density of the crosslinked foam can be adjusted by using a crosslinking aid in combination with the crosslinking agent.

As the crosslinking aid, one or two or more selected from divinyl benzene, trimethylolpropanetrimethacrylate, 1,6-hexanediol methacrylate, 1,9-nonanediol dimethacrylate, 1,10-decanediol dimethacrylate, triallyl trimellitate ester, triallyl isocyanate, neopentyl glycol dimethacrylate, 1,2,4-benzenetricarboxylic acid triallyl ester, tricyclodecane dimethacrylate, and polyethylene glycol diacrylate, for example, can be applied.

Further, the crosslinked foam may be obtained by blending inorganic particles having high surface energy such as clay, talc, silica, and carbon black with the polymer composition to form pseudo crosslinking points in the polymer composition by the inorganic particles.

As the foaming agent, one or two or more selected from azo compounds such as azodicarbonamide (ADCA), 1,1'-azobis (1-acetoxy-1-phenylethane), dimethyl-2,2'-azobisbutyrate, dimethyl-2,2'-azobisisobutyrate, 2,2'-azobis (2,4,4-trimethylpentane), 1,1'-azobis (cyclohexane-1-carbonitrile), and 2,2'-azobis [N-(2-carboxyethyl)-2-methyl-propionamidine]; nitroso compounds such as N,N'-dinitrosopentamethylenetetramine (DPT); hydrazine derivatives such as 4,4'-oxybis(benzenesulfonyl hydrazide) and diphenylsulfone-3,3'-disulfonyl hydrazide; semicarbazide compounds such as p-toluenesulfonyl semicarbazide; and thermally decomposable organic foaming agents such as trihydrazino triazine, for example, can be applied.

Further, as the foaming agent, one or two or more selected from bicarbonates such as sodium hydrogencarbonate and ammonium hydrogen carbonate; carbonates such as sodium carbonates and ammonium carbonates; nitrites such as ammonium nitrite; and thermally decomposable inorganic foaming agents such as hydrogen compounds can be applied.

Further, organic foaming agents including various aliphatic hydrocarbons such as methanol, ethanol, propane, butane, pentane, and hexane, and inorganic foaming agents such as air, carbon dioxide, nitrogen, argon, and water also can be used as the foaming agent for forming the crosslinked foam.

Examples of other additives to be contained in the crosslinked foam include dispersants, processing aids, weathering agents, flame retardants, pigments, mold release agents, antistatic agents, antibacterial agents, and deodorizers.

The method for forming such a crosslinked foam is not specifically limited, and a conventionally known method can be applied.

The shoe sole member of the present invention is exemplified as above in this embodiment. However, the shoe sole member of the present invention is not limited to the aforementioned examples.

The shoe sole member of the present invention may be formed using only the aforementioned crosslinked foam, or may be formed using other materials such as fabrics and resin sheets in combination, within the range in which the effects such as lightness of weight, softness, and excellent recovery properties from compressive deformation are not significantly impaired.

Further, conventionally known technical matters may be applied in the shoe sole member of the present invention within the range in which the effects of the present invention are not significantly impaired, even if the matters are not specifically described above.

EXAMPLES

Next, the present invention is described further in detail by way of examples. However, the present invention is not limited to these examples.

Preliminary Examination 1

A styrene elastomer having a hard segment and a soft segment (hereinafter, referred to also as "TPS1"), three types of olefin elastomers (hereinafter, referred to also as "TPO1", "TPO2", and "TPO3"), and ethylene-vinyl acetate copolymer (hereinafter, referred to also as "EVA1") were prepared, for which the spin-spin relaxation time ($T_{2S}$, $T_{2M}$, and $T_{2L}$) at 25° C. and the content ratio ($F_S$, $F_M$, and $F_L$) of each phase (the s phase, the m phase, and the l phase) were measured in an uncrosslinked state using pulsed NMR.

Further, also for crosslinked foams produced using these polymers, the spin-spin relaxation time and the content ratio of each phase were measured using pulsed NMR.

Table 1 below shows the results.

TABLE 1

| No. | Polymer type | Measurement state | $T_{2L}$[ms] | $T_{2M}$[ms] | $T_{2S}$[ms] | $F_L$ | $F_M$ | $F_S$ |
|---|---|---|---|---|---|---|---|---|
| 1-1 | TPS1 | Uncrosslinked | 0.190 | 0.056 | 0.016 | 0.37 | 0.54 | 0.09 |
| 1-2 | TPS1 | Crosslinked foam | 0.245 | 0.072 | 0.014 | 0.44 | 0.48 | 0.09 |
| 2-1 | TPO1 | Uncrosslinked | 0.225 | 0.055 | 0.012 | 0.29 | 0.52 | 0.20 |
| 2-2 | TPO1 | Crosslinked foam | 0.220 | 0.053 | 0.012 | 0.29 | 0.53 | 0.18 |
| 3-1 | TPO2 | Uncrosslinked | 0.260 | 0.066 | 0.011 | 0.42 | 0.40 | 0.18 |
| 3-2 | TPO2 | Crosslinked foam | 0.261 | 0.065 | 0.011 | 0.44 | 0.40 | 0.16 |
| 4-1 | TPO3 | Uncrosslinked | 0.295 | 0.070 | 0.011 | 0.66 | 0.23 | 0.11 |
| 4-2 | TPO3 | Crosslinked foam | 0.313 | 0.076 | 0.010 | 0.68 | 0.20 | 0.11 |
| 5-1 | EVA1 | Uncrosslinked | 0.258 | 0.049 | 0.012 | 0.25 | 0.52 | 0.24 |
| 5-2 | EVA1 | Crosslinked foam | 0.273 | 0.052 | 0.011 | 0.27 | 0.51 | 0.22 |

Preliminary Examination 2

Crosslinked foams were produced using mixed resins obtained by blending the styrene elastomer (TPS1) of Preliminary Examination 1 and the first olefin elastomer (TPO1) respectively at mass ratios (TPS1/TPO1) of "80/20", "70/30", and "60/40".

Then, the crosslinked foams were measured using pulsed NMR to determine the spin-spin relaxation time ($T_{2S}$, $T_{2M}$, and $T_{2L}$) at 25° C. and the ratio ($F_S$, $F_M$, and $F_L$) of each phase (the s phase, the m phase, the l phase).

Further, in order to predict the results of the pulsed NMR measurement of the crosslinked foams using the mixed resins, a weighted average based on data (No. 1-2 and No. 2-2) of the crosslinked foams in Table 1 was determined by calculation.

That is, the value of "$T_{2L}$" of the crosslinked foam with a ratio of "80/20" was predicted to be "0.240" by calculating the formula "(0.245×80+0.220×20)/100" from the facts that the value of "$T_{2L}$" of "TPS1" in Table 1 was "0.245", and the value of "$T_{2L}$" of "TPO1" was "0.220".

Further, weighted averages were also determined likewise by calculation to predict values of the spin-spin relaxation time ($T_{2S}$ and $T_{2M}$) of the other phases and the ratio ($F_S$, $F_M$, and $F_L$) of each phase.

Table 2 below shows the predicted values using weighted averages and the actually measured values of the crosslinked foams.

TABLE 2

| TPS1/TPO1 | Measurement state | $T_{2L}$[ms] | $T_{2M}$[ms] | $T_{2S}$[ms] | $F_L$ | $F_M$ | $F_S$ |
|---|---|---|---|---|---|---|---|
| 80/20 | Crosslinked foam | 0.238 | 0.065 | 0.014 | 0.455 | 0.445 | 0.100 |
|  | Predicted value | 0.240 | 0.068 | 0.014 | 0.408 | 0.487 | 0.105 |
| 70/30 | Crosslinked foam | 0.230 | 0.061 | 0.012 | 0.385 | 0.507 | 0.108 |
|  | Predicted value | 0.237 | 0.066 | 0.014 | 0.393 | 0.492 | 0.115 |
| 60/40 | Crosslinked foam | 0.232 | 0.061 | 0.013 | 0.406 | 0.475 | 0.119 |
|  | Predicted value | 0.235 | 0.064 | 0.014 | 0.379 | 0.497 | 0.124 |

Further, a crosslinked foam was produced using a mixed resin obtained by blending a styrene elastomer (hereinafter, referred to also as "TPS2") having values of the spin-spin relaxation time ($T_{2S}$, $T_{2M}$, and $T_{2L}$), and the ratio ($F_S$, $F_M$, and $F_L$) of each phase as shown in Table 3 below in an uncrosslinked state and the aforementioned olefin elastomer (TPO1) at a mass ratio (TPS1/TPO1) of "80/20".

The crosslinked foam was measured using pulsed NMR to determine the spin-spin relaxation time ($T_{2S}$, $T_{2M}$, and $T_{2L}$) at 25° C. and the ratio ($F_S$, $F_M$, and $F_L$) of each phase.

Further, in order to predict the results of the pulsed NMR measurement of the crosslinked foam, a weighted average based on data (No. 2-1) of the olefin elastomer (TPO1) in Table 1 in an uncrosslinked state and data (No. 6-1) of the styrene elastomer (TPS2) shown in Table 3 below in an uncrosslinked state was determined by calculation.

Table 3 shows the predicted value together with the actual measured value of the crosslinked foam.

Examples and Comparative Examples

In addition to the styrene elastomers (TPS1 and TPS2), the olefin elastomer (TPO1), and the ethylene-vinyl acetate copolymer (EVA1) used for the preliminary examination, other styrene elastomers (TPS3 and TPS4) and another olefin elastomer (TPO4) were prepared.

Then, crosslinked foams were produced at mixing ratios as shown in Tables 5 to 7 below.

The measurement results of the spin-spin relaxation time at 25° C. and the content ratio of each phase obtained by measuring the styrene elastomers (TPS3 and TPS4) and the olefin elastomer (TPO4) in an uncrosslinked state using pulsed NMR are as shown in Table 4 below.

TABLE 4

|  | $T_{2L}$[ms] | $T_{2M}$[ms] | $T_{2S}$[ms] | $F_L$ | $F_M$ | $F_S$ |
|---|---|---|---|---|---|---|
| TPS3 | 0.437 | 0.240 | 0.013 | 0.70 | 0.22 | 0.08 |
| TPS4 | 0.474 | — | 0.010 | 0.96 | 0.00 | 0.04 |
| TPO4 | 0.570 | 0.176 | 0.011 | 0.72 | 0.23 | 0.05 |

TABLE 3

| No. | Polymer type | Measurement state | $T_{2L}$[ms] | $T_{2M}$[ms] | $T_{2S}$[ms] | $F_L$ | $F_M$ | $F_S$ |
|---|---|---|---|---|---|---|---|---|
| 6-1 | TPS2 | Uncrosslinked | 0.177 | 0.06 | 0.017 | 0.42 | 0.52 | 0.06 |
| TPS2/TPO1 = 80/20 | | Crosslinked foam | 0.196 | 0.060 | 0.013 | 0.382 | 0.527 | 0.091 |
| | | Predicted value | 0.187 | 0.059 | 0.016 | 0.394 | 0.520 | 0.088 |

It can be seen also from the results shown in the aforementioned tables that, when a crosslinked foam is created using a polymer, prediction of the values of the spin-spin relaxation time and the content ratio of each phase of the crosslinked foam is facilitated by subjecting the polymer before crosslinking to the measurement of the spin-spin relaxation time and the ratio of each phase using pulsed NMR.

That is, it can be seen from the results shown in the aforementioned tables that it is easy to predict whether or not the crosslinked foam satisfies the following inequality in advance.

$$[(F_M/T_{2M}+F_L/T_{2L})/(F_S/T_{2S})]>0.8 \quad \text{Formula 7}$$

Tables 5 and 6 show the measurement results of the Asker C hardness and the compression set of the crosslinked foams and the measurement results using pulsed NMR altogether.

Figure 2:
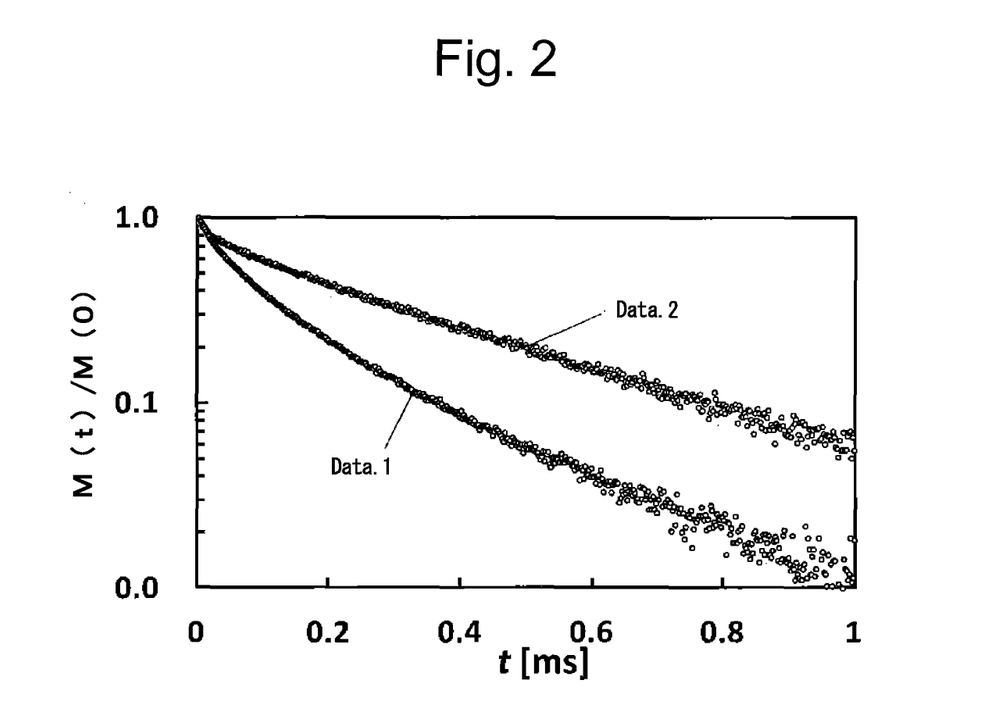
FIG. 2 is a comparison graph showing the results of pulsed NMR measurement for the crosslinked foams of Example 3 and Comparative Example 1.

Further, FIG. 2 shows a graph of the pulsed NMR measurement of Example 3 and Comparative Example 1.

The measurement results of Example 3 are shown by "Data.1" in FIG. 2, and the measurement results of Comparative Example 1 are shown by "Data.2".

Further, the tensile loss modulus (tan δ) at 20° C. was measured for the obtained crosslinked foams according to JIS K 7244-4 "Plastic—Test method for dynamic mechanical properties—Part 4: Tensile vibration—Non-resonance method".

TABLE 5

|  | EX. 1 | EX. 2 | EX. 3 | EX. 4 | EX. 5 | EX. 6 |
|---|---|---|---|---|---|---|
| TPS1 | 100 | 80 | 80 | 80 | 70 | 70 |
| TPS2 | — | — | — | — | — | — |

TABLE 5-continued

|  | EX. 1 | EX. 2 | EX. 3 | EX. 4 | EX. 5 | EX. 6 |
|---|---|---|---|---|---|---|
| TPO1 | — | 20 | 20 | 20 | 30 | 30 |
| Asker C hardness (JIS K7312) | 15 | 30 | 25 | 22 | 37 | 28 |
| Specific gravity (JIS K7112) | 0.173 | 0.245 | 0.186 | 0.138 | 0.203 | 0.167 |
| Compression set (ASTMD395A)[%] | 22 | 9 | 14 | 34 | 18 | 27 |
| Tanδ (20° C.) | 0.164 | 0.146 | 0.146 | 0.146 | 0.139 | 0.139 |
| $T_{2L}$[ms] | 0.245 | 0.238 | 0.238 | 0.238 | 0.230 | 0.230 |
| $T_{2M}$[ms] | 0.072 | 0.065 | 0.065 | 0.065 | 0.061 | 0.061 |
| $T_{2S}$[ms] | 0.014 | 0.014 | 0.014 | 0.014 | 0.012 | 0.012 |
| $F_L$ | 0.44 | 0.45 | 0.45 | 0.45 | 0.38 | 0.38 |
| $F_M$ | 0.48 | 0.44 | 0.44 | 0.44 | 0.51 | 0.51 |
| $F_S$ | 0.09 | 0.10 | 0.10 | 0.10 | 0.11 | 0.11 |
| $(F_M/T_{2M} + F_L/T_{2L})/(F_S/T_{2S})$ | 1.40 | 1.22 | 1.22 | 1.22 | 1.11 | 1.11 |

TABLE 6

|  | EX. 7 | EX. 8 | EX. 9 | EX. 10 | EX. 11 | EX. 12 | EX. 13 | EX. 14 |
|---|---|---|---|---|---|---|---|---|
| TPS1 | 60 | 60 | 60 | 60 | 40 | 40 | — | — |
| TPS2 | — | — | — | — | — | — | 80 | 80 |
| TPO1 | 40 | 40 | 40 | 40 | 60 | 60 | 20 | 20 |
| Asker C hardness (JIS K7312) | 49 | 47 | 40 | 30 | 54 | 52 | 43 | 36 |
| Specific gravity (JIS K7112) | 0.300 | 0.284 | 0.200 | 0.150 | 0.300 | 0.284 | 0.247 | 0.184 |
| Compression set (ASTMD395A)[%] | 7 | 9 | 15 | 38 | 6 | 7 | 10 | 20 |
| Tanδ (20° C.) | 0.151 | 0.151 | 0.151 | 0.151 | 0.085 | 0.085 | 0.131 | 0.131 |
| $T_{2L}$[ms] | 0.232 | 0.232 | 0.232 | 0.232 | 0.263 | 0.263 | 0.196 | 0.196 |
| $T_{2M}$[ms] | 0.061 | 0.061 | 0.061 | 0.061 | 0.064 | 0.064 | 0.060 | 0.060 |
| $T_{2S}$[ms] | 0.013 | 0.013 | 0.013 | 0.013 | 0.012 | 0.012 | 0.013 | 0.013 |
| $F_L$ | 0.41 | 0.41 | 0.41 | 0.41 | 0.41 | 0.41 | 0.38 | 0.38 |
| $F_M$ | 0.47 | 0.47 | 0.47 | 0.47 | 0.47 | 0.47 | 0.53 | 0.53 |
| $F_S$ | 0.12 | 0.12 | 0.12 | 0.12 | 0.12 | 0.12 | 0.09 | 0.09 |
| $(F_M/T_{2M} + F_L/T_{2L})/(F_S/T_{2S})$ | 1.03 | 1.03 | 1.03 | 1.03 | 0.89 | 0.89 | 1.60 | 1.60 |

TABLE 7

|  | C. EX. 1 | C. EX. 2 | C. EX. 3 | C. EX. 4 | C. EX. 5 | C. EX. 6 | C. EX. 7 |
|---|---|---|---|---|---|---|---|
| TPS3 | 80 | — | — | — | — | — | — |
| TPS4 | — | 80 | — | — | — | — | — |
| TPO1 | 20 | 20 | 20 | — | 100 | 100 | 100 |
| TPO4 | — | — | 80 | — | — | — | — |
| EVA1 | — | — | — | 100 | — | — | — |
| Asker C hardness (JIS K7312) | 29 | 30 | 27 | 45 | 44 | 52 | 62 |
| Specific gravity (JIS K7112) | 0.165 | 0.170 | 0.158 | 0.160 | 0.150 | 0.198 | 0.260 |
| Compression set (ASTMD395A)[%] | 62 | 50 | 51 | 56 | 59 | 48 | 29 |
| Tanδ (20° C.) | 0.052 | 0.133 | 0.069 | 0.124 | 0.068 | 0.068 | 0.068 |
| $T_{2L}$[ms] | 0.389 | 0.432 | 0.455 | 0.273 | 0.220 | 0.220 | 0.220 |
| $T_{2M}$[ms] | 0.071 | 0.084 | 0.093 | 0.052 | 0.053 | 0.053 | 0.053 |
| $T_{2S}$[ms] | 0.011 | 0.012 | 0.011 | 0.011 | 0.012 | 0.012 | 0.012 |
| $F_L$ | 0.72 | 0.79 | 0.65 | 0.27 | 0.29 | 0.29 | 0.29 |
| $F_M$ | 0.17 | 0.12 | 0.27 | 0.51 | 0.53 | 0.53 | 0.53 |
| $F_S$ | 0.11 | 0.09 | 0.08 | 0.22 | 0.18 | 0.18 | 0.18 |
| $(F_M/T_{2M} + F_L/T_{2L})/(F_S/T_{2S})$ | 0.44 | 0.45 | 0.65 | 0.55 | 0.77 | 0.77 | 0.77 |

Figure 3:
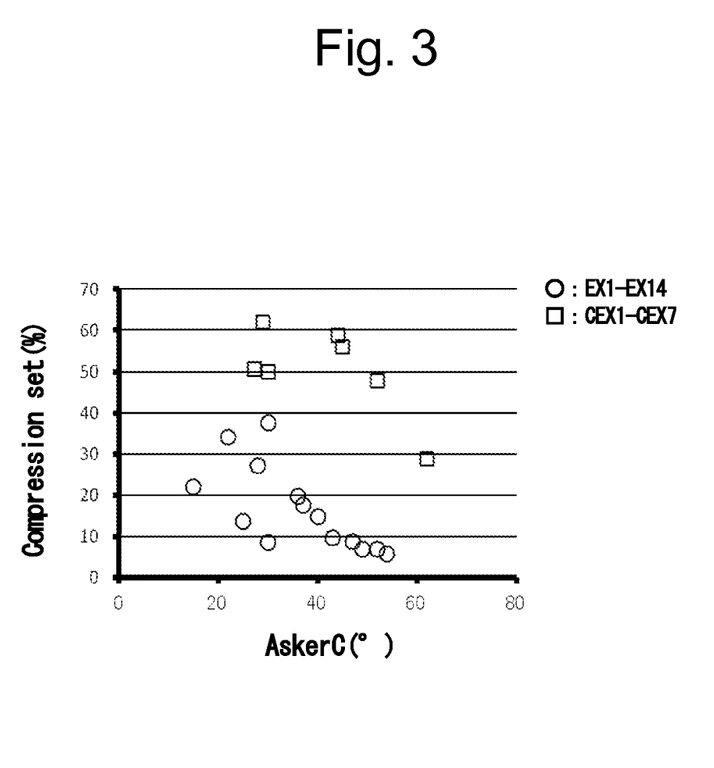
FIG. 3 is a graph showing the relationship between the Asker C hardness and the compression set of the crosslinked foams according to the examples and the comparative examples.

FIG. 3 shows the relationship between the Asker C hardness and the compression set of the data shown in Tables 5 to 7 above, which is graphed and and separately shown as the examples and the comparative examples.

The data shown by circles in FIG. 3 are the data of the crosslinked foams of Examples 1 to 14, and the data shown by squares are the data of the crosslinked foams of Comparative Examples 1 to 7.

FIG. 3 shows that, even if the crosslinked foams have the same Asker C hardness, the crosslinked foams of Examples have lower compression set.

It can be seen also from these results that the present invention can provide a shoe sole member that is light and soft and that exhibits excellent recovery properties after use from compressive deformation applied during the use.

Reference Experiment

For the two types of commercially available ethylene-vinyl acetate copolymers shown below, the relaxation time at 25° C. and the ratio of each phase (the s phase, the m phase, the l phase) were measured in an uncrosslinked state using pulsed NMR to calculate the values of $[(F_M/T_{2M}+F_L/T_{2L})/(F_S/T_{2S})]$.

EVA2: Ethylene-vinyl acetate copolymer (VA10%), "Ultrasen 540" (product name), manufactured by Tosoh Corporation EVA3: Ethylene-vinyl acetate copolymer (VA20%), "Ultrasen 631" (product name), manufactured by Tosoh Corporation Table 8 below shows the results.

TABLE 8

| | $T_{2L}$ [ms] | $T_{2M}$ [ms] | $T_{2S}$ [ms] | $F_L$ | $F_M$ | $F_S$ | $(F_M/T_{2M}+F_L/T_{2L})/(F_S/T_{2S})$ |
|---|---|---|---|---|---|---|---|
| EVA2 | 0.197 | 0.038 | 0.010 | 0.15 | 0.49 | 0.36 | 0.37 |
| EVA3 | 0.202 | 0.040 | 0.011 | 0.18 | 0.54 | 0.28 | 0.55 |

Although the above-described results were not obtained by measuring crosslinked foams using pulsed NMR but were obtained by measuring the copolymers in an uncrosslinked state, it can be seen from the experimental results so far that, products satisfying the following inequality are not generally obtained, even if they are crosslinked and foamed.

$$[(F_M/T_{2M}+F_L/T_{2L})/(F_S/T_{2S})]>0.8 \quad \text{Formula 8}$$

That is, it can be understood from the above-described results that, being different from the shoe sole members of the present invention, the conventional shoe sole members mainly using crosslinked foams composed of ethylene-vinyl acetate copolymers would never be members that exhibit excellent recovery properties after use from compressive deformation applied during the use, while being light and soft.

REFERENCE SIGNS LIST

1: Shoe
3: Midsole
4: Outer sole

The invention claimed is:

1. A shoe sole member comprising a crosslinked foam forming a part or the whole of the shoe sole member,
the crosslinked foam having a specific gravity of not more than 0.3, an Asker C hardness of not more than 55, and a compression set of not more than 40% as measured based on an ASTM D395 A method,
the crosslinked foam being formed by a polymer composition satisfying conditions represented by the following inequality:

$$[(F_M/T_{2M}+F_L/T_{2L})/(F_S/T_{2S})]>0.8, \text{ where} \quad \text{Formula 1}$$

the inequality is determined by measuring a spin-spin relaxation time of the polymer composition at 25° C. using pulsed NMR,
the term "$F_M$" in the inequality denotes a content ratio in the polymer composition of an m phase in which the spin-spin relaxation time is at least 0.02 ms and less than 0.1 ms,
the term "$T_{2M}$" denotes a total spin-spin relaxation time in the m phase,
the term "$F_L$" denotes a content ratio in the polymer composition of an l phase in which the spin-spin relaxation time is at least 0.1 ms,
the term "$T_{2L}$" denotes a total spin-spin relaxation time in the l phase,
the term "$F_S$" denotes a content ratio in the polymer composition of an s phase in which the spin-spin relaxation time is less than 0.02 ms, and
the term "$T_{2S}$" denotes a total spin-spin relaxation time in the s phase.

2. The shoe sole member according to claim 1, wherein the crosslinked foam has a specific gravity of not more than 0.25 and an Asker C hardness of not more than 45, and
the crosslinked foam is formed by a polymer composition satisfying conditions represented by the following inequality:

$$[(F_M/T_{2M}+F_L/T_{2L})/(F_S/T_{2S})]>1, \text{ where} \quad \text{Formula 2}$$

the inequality is determined by measuring a spin-spin relaxation time of the polymer composition at 25° C. using pulsed NMR,
the term "$F_M$" in the inequality denotes a content ratio in the polymer composition of an m phase in which the spin-spin relaxation time is at least 0.02 ms and less than 0.1 ms,
the term "$T_{2M}$" denotes a total spin-spin relaxation time in the m phase,
the term "$F_L$" denotes a content ratio in the polymer composition of an l phase in which the spin-spin relaxation time is at least 0.1 ms,
the term "$T_{2L}$" denotes a total spin-spin relaxation time in the l phase,
the term "$F_S$" denotes a content ratio in the polymer composition of an s phase in which the spin-spin relaxation time is less than 0.02 ms, and
the term "$T_{2S}$" denotes a total spin-spin relaxation time in the s phase.

3. The shoe sole member according to claim 1, wherein the crosslinked foam has a tensile loss modulus at 20° C. of not more than 0.2, as measured according to JIS K 7244-4 "Plastic—Test method for dynamic mechanical properties—Part 4: Tensile vibration—Non-resonance method".

4. Shoes comprising the shoe sole member according to claim 1.

* * * * *